United States Patent
Cha et al.

(10) Patent No.: US 12,179,653 B2
(45) Date of Patent: Dec. 31, 2024

(54) MANAGEMENT SYSTEM FOR MICRO MOBILITY VEHICLE

(71) Applicants: Hyundai Motor Company, Seoul (KR); Kia Corporation, Seoul (KR)

(72) Inventors: Dong Eun Cha, Hwaseong-si (KR); Sang Heon Lee, Seoul (KR); Jin Ho Hwang, Cheonan-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 370 days.

(21) Appl. No.: 17/692,553

(22) Filed: Mar. 11, 2022

(65) Prior Publication Data

US 2022/0402420 A1 Dec. 22, 2022

(30) Foreign Application Priority Data

Jun. 21, 2021 (KR) .................. 10-2021-0080265

(51) Int. Cl.
*B60P 3/07* (2006.01)
*B60L 53/30* (2019.01)
(Continued)

(52) U.S. Cl.
CPC .............. *B60P 3/07* (2013.01); *B60L 53/305* (2019.02); *B60L 53/57* (2019.02); *B60L 53/62* (2019.02);
(Continued)

(58) Field of Classification Search
CPC .... B60P 3/06; B60P 3/07; B60P 3/073; B60L 53/305; B60L 53/57; B60L 53/62;
(Continued)

(56) References Cited

U.S. PATENT DOCUMENTS

2019/0263281 A1   8/2019   Wang
2019/0282417 A1*  9/2019   Walker .................. B60R 11/04
(Continued)

FOREIGN PATENT DOCUMENTS

CN       109109877 A  *  1/2019  ............. B60L 50/50
JP       2004-010028 A     1/2004
(Continued)

OTHER PUBLICATIONS

English translation of JP-2016038668-A (Year: 2016).*
English translation of CN-109109877-A (Year: 2019).*

*Primary Examiner* — Shon G Foley
(74) *Attorney, Agent, or Firm* — Morgan, Lewis & Bockius LLP (57) ABSTRACT

A management system for a micro mobility vehicle, includes a service vehicle which is configured to travel along a movement path, wherein the service vehicle includes an accommodation slot for accommodating the micro mobility vehicle, and is configured for exchanging power with the micro mobility vehicle when the micro mobility vehicle is accommodated in the accommodation slot; and a management server configured to communicate with the micro mobility vehicle and the service vehicle to determine a location and a charging amount of the micro mobility vehicle and configured to manage charging and arrangement of the micro mobility vehicle by guiding the service vehicle to allow the micro mobility vehicle to be accommodated in the service vehicle or withdraw the micro mobility vehicle from the service vehicle.

19 Claims, 3 Drawing Sheets

(51) Int. Cl.
*B60L 53/57* (2019.01)
*B60L 53/62* (2019.01)
*B60L 53/66* (2019.01)
*G05D 1/00* (2006.01)
*G06Q 30/04* (2012.01)
*G06Q 30/0645* (2023.01)
*H04L 67/12* (2022.01)

(52) U.S. Cl.
CPC ............ *B60L 53/66* (2019.02); *G05D 1/0276* (2013.01); *G06Q 30/04* (2013.01); *G06Q 30/0645* (2013.01); *G06Q 2240/00* (2013.01); *H04L 67/12* (2013.01)

(58) Field of Classification Search
CPC .. B60L 53/66; B60L 2200/22; B60L 2200/24; B60L 53/00; B60L 53/30; B60L 58/12; H04L 67/12; G06Q 10/08; G06Q 50/40
See application file for complete search history.

(56) References Cited

U.S. PATENT DOCUMENTS

2019/0375301 A1   12/2019   Whitt et al.
2021/0334893 A1*  10/2021   Hyun ................. G06Q 30/0645

FOREIGN PATENT DOCUMENTS

| JP | 2007-331725 A |   | 12/2007 |
| JP | 2016038668 A | * | 3/2016 |
| KR | 10-2020-0026493 A | | 3/2020 |
| KR | 10-2020-0104036 A | | 9/2020 |
| KR | 10-2021-0001310 A | | 1/2021 |
| KR | 10-2021-0014985 A | | 2/2021 |

* cited by examiner

MANAGEMENT SYSTEM FOR MICRO MOBILITY VEHICLE

CROSS REFERENCE TO RELATED APPLICATION

The present application claims priority to Korean Patent Application No. 10-2021-0080265 filed on Jun. 21, 2021, the entire contents of which is incorporated herein for all purposes by this reference.

BACKGROUND OF THE PRESENT DISCLOSURE

Field of the Present Disclosure

The present disclosure relates a management system for a micro mobility vehicle in which a management server identifies a location and a charging amount of a micro mobility vehicle located on a movement path of a service vehicle, and the service vehicle selectively collects the micro mobility vehicle or exchanges the micro mobility vehicle with a micro mobility vehicle accommodated in an accommodation slot of the service vehicle on the basis of the identified location and the identified charging amount of the micro mobility vehicle so that the micro mobility vehicle provided to a user is managed and the user requests the micro mobility vehicle or to service vehicle to rapidly and conveniently move to a desired destination.

Description of Related Art

With the recent development of technology, various types of mobility vehicles have been developed to move passengers to their destinations more conveniently and rapidly. Conventionally, passengers who want to move have moved to desired places using their own vehicles or public transportation and moved from parking lots of the vehicles or stop points of the public transportation to final destinations by walking or the like.

However, recently, micro mobility vehicles which allow passengers to ride to final destinations or move rapidly and easily in desired sections, which are provided in an electric kickboard sharing service, have become an issue. The micro mobility vehicle has an advantage in that the micro mobility vehicle is provided in a predetermined place and shared by several people, and after used, the micro mobility vehicle freely returned to a place so that other people can use the micro mobility vehicle again at the return place.

In general, the micro mobility vehicles are provided at train stations or bus stops so that passengers can use public transportation to move to their desired final destinations by riding the micro mobility vehicles. After the use of the passengers is finished, the micro mobility vehicles are separately collected at the return place at a predetermined time interval and then disposed again at an initial place.

The micro mobility vehicle has a driving power through a battery. As described above, when the micro mobility vehicle is collected according to a predetermined time interval (e.g., late at night after one day's use is finished), there is a need to replace or charge the battery and there is a need for the micro mobility vehicle to be moved and disposed in a place where a demand for the micro mobility vehicle is high.

However, in situations in which users flock to a specific arrangement place before the above-described collection time, the battery of the micro mobility vehicle rapidly runs out due to frequent use, or a malfunction occurs, there is a problem in that the users cannot use the micro mobility vehicle until the micro mobility vehicle is replaced. Furthermore, in the case of using public transportation or a vehicle, when the micro mobility vehicles run out around a drop-off place and thus there is no available micro mobility vehicle, it may cause inconvenience that passengers cannot use the micro mobility vehicles in a situation in which the micro mobility vehicles are necessary.

It is necessary to develop a management system for a micro mobility vehicle, which is capable of managing the micro mobility vehicle according to a situation thereof by charging the battery of the micro mobility vehicle or performing maintenance on the micro mobility vehicle and is capable of rapidly and conveniently moving the passenger to a final destination by allowing both a vehicle and the micro mobility vehicle to be used in a section desired by the passenger in connection with the vehicle.

The information included in this Background of the present disclosure section is only for enhancement of understanding of the general background of the present disclosure and may not be taken as an acknowledgement or any form of suggestion that this information forms the prior art already known to a person skilled in the art.

Brief Summary

Various aspects of the present disclosure are directed to providing a management system for a micro mobility vehicle in which a management server identifies a location and a charging amount of a micro mobility vehicle located on a movement path of a service vehicle, and the service vehicle selectively collects the micro mobility vehicle, in which a charging amount of a battery is insufficient or maintenance is required, or exchanges the micro mobility vehicle with a micro mobility vehicle accommodated in an accommodation slot of the service vehicle based on the identified location and the identified charging amount of the micro mobility vehicle so that the micro mobility vehicle provided to a user is managed and the user requests the micro mobility vehicle or a service vehicle to rapidly and conveniently move to a desired destination.

According to one aspect, there is provided a management system for a micro mobility vehicle, which includes a service vehicle which is configured to travel along a movement path, wherein the service vehicle includes an accommodation slot for accommodating the micro mobility vehicle, and is configured for exchanging power with the micro mobility vehicle when the micro mobility vehicle is accommodated in the accommodation slot; and a management server configured to communicate with the micro mobility vehicle and the service vehicle to determine a location and a charging amount of the micro mobility vehicle and configured to manage charging and arrangement of the micro mobility vehicle by guiding the service vehicle to allow the micro mobility vehicle to be accommodated in the service vehicle or withdraw the micro mobility vehicle from the service vehicle.

A withdrawal part configured to withdraw or accommodate the micro mobility vehicle may be provided on a side of the accommodation slot, and the accommodation slot may be disposed to direct the withdrawal part to face an external wall of the service vehicle.

The withdrawal part may be provided on a side surface of the service vehicle to form a part of the side surface of the service vehicle, and the withdrawal part may be vertically rotated to be opened or closed or slides in a lateral direction to be opened or closed.

The management server may set the movement path of the service vehicle based on a location of the micro mobility vehicle or a charging amount thereof and guide the service vehicle to travel along the set movement path.

The management server may guide the service vehicle to accommodate a micro mobility vehicle located on the movement path to charge a battery of the micro mobility vehicle or to withdraw the micro mobility vehicle in which the battery is charged to arrange the micro mobility vehicle on the movement path.

The management server may determine whether to collect the micro mobility vehicle based on the location of the arranged micro mobility vehicle or the charging amount of the micro mobility vehicle, and when the collection of the micro mobility vehicle is required, the management server may allocate the service vehicle to a place where the micro mobility vehicle is disposed.

When the arranged micro mobility vehicle is located in a place where a use frequency of the user is lower than a number of predetermined use frequency, the charging amount is lower than a predetermined charging amount, or maintenance is required, the management server may determine that the collection of the micro mobility vehicle is necessary.

The allocated service vehicle may accommodate a micro mobility vehicle, which is a collection target, in the accommodation slot to collect the micro mobility vehicle, and a battery of the accommodated micro mobility vehicle may be charged in the accommodation slot.

The allocated service vehicle may be provided with a new micro mobility vehicle in the accommodation slot, may withdraw the new micro mobility vehicle, and may accommodate a micro mobility vehicle which is a collection target to replace the micro mobility vehicle.

An internal space may be formed in the service vehicle, and the user may board in the internal space or the accommodation slot may be disposed therein.

When a rental request for the micro mobility vehicle or a request to use of the service vehicle is received from the user, the management server may allocate the service vehicle in which the micro mobility vehicle is accommodated, to a request place to rent the micro mobility vehicle to the user or to allow the user to board the service vehicle.

When a return request for the micro mobility vehicle or a request to use of the service vehicle is received from the user, the management server may allocate the service vehicle to a request place to allow the user to return the micro mobility vehicle to the service vehicle or to allow the user to board the service vehicle.

When a request to use of the micro mobility vehicle or the service vehicle is received from the user, the management server may allocate the service vehicle in which the micro mobility vehicle is accommodated, to a request place to allow the user to board the service vehicle, and to provide the micro mobility vehicle to the user when the user gets off.

The management server may communicate with a user terminal or a kiosk provided inside or outside the service vehicle to receive a request to use of the micro mobility vehicle or the service vehicle from the user.

When the request to use of the micro mobility vehicle or the service vehicle is received from the user, or when the user terminates the use of the micro mobility vehicle or the service vehicle, the management server may determine a usage fee of the micro mobility vehicle or the service vehicle to bill the usage fee to the user.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Figure 1:
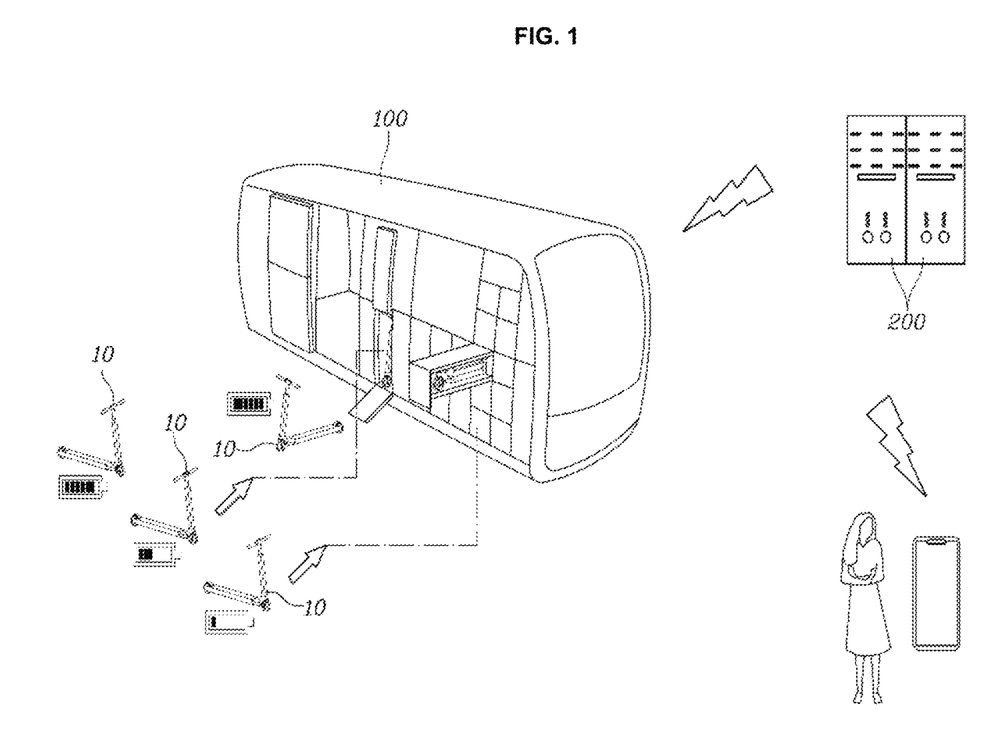
FIG. 1 is a diagram illustrating a management system for a micro mobility vehicle according to an exemplary embodiment of the present disclosure.
Figure 2:
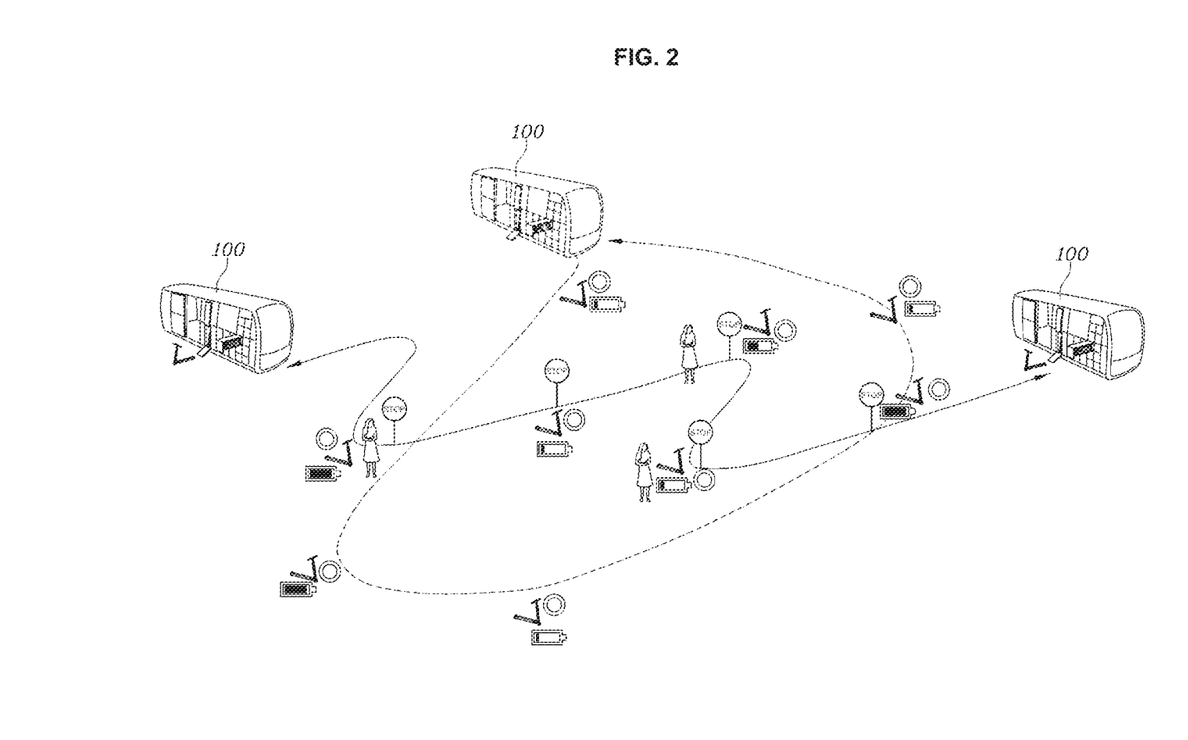
FIG. 2 is a diagram illustrating a movement path of a service vehicle in the management system for a micro mobility vehicle according to an exemplary embodiment of the present disclosure.
Figure 3:
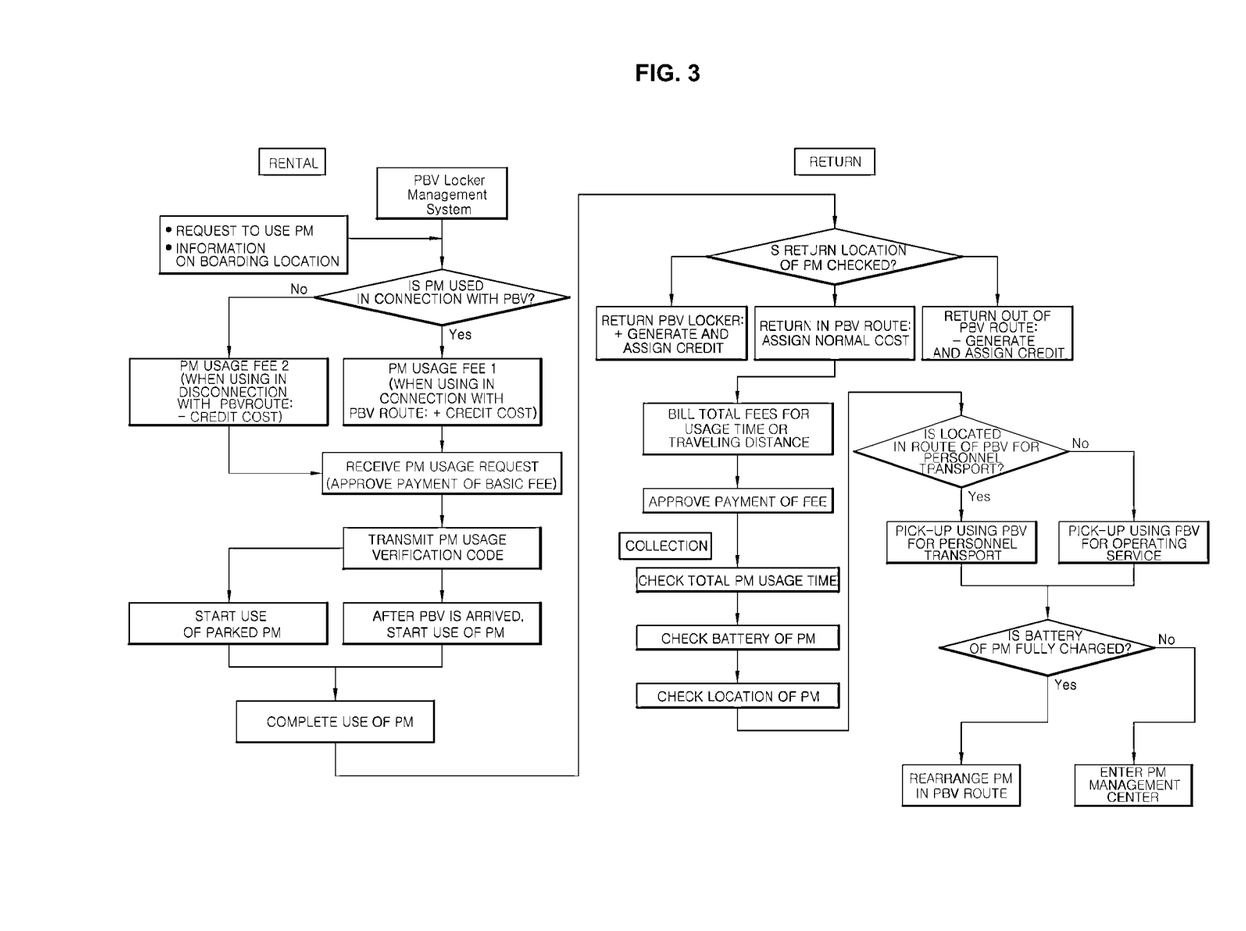
FIG. 3 is a diagram illustrating an exemplary scenario of the management system for a micro mobility vehicle according to an exemplary embodiment of the present disclosure.

FIG. 1 is a diagram illustrating a management system for a micro mobility vehicle according to an exemplary embodiment of the present disclosure. FIG. 2 is a diagram illustrating a movement path of a service vehicle 100 in the management system for a micro mobility vehicle according to an exemplary embodiment of the present disclosure. FIG. 3 is a diagram illustrating an exemplary scenario of the management system for a micro mobility vehicle according to an exemplary embodiment of the present disclosure.

A management server 200 according to an exemplary embodiment of the present disclosure may be implemented through an algorithm configured to control operations of various components of the vehicle, a non-volatile memory configured to store data relating to software commands to reproduce the algorithm, or a processor configured to perform operations, which will be described below, using data stored in a corresponding memory. Here, the memory and the processor may be implemented as separate chips. Alternatively, the memory and the processor may be implemented as a single chip integrated with each other, and the processor may be formed in a form of one or more processors.

FIG. 1 is a diagram illustrating a management system for a micro mobility vehicle according to an exemplary embodiment of the present disclosure. The management system for a micro mobility vehicle according to an exemplary embodiment of the present disclosure includes a service vehicle 100 which travels along a movement path, in which an accommodation slot for accommodating a micro mobility vehicle 10 is provided, and which is configured for exchanging power with the micro mobility vehicle 10 when the micro mobility vehicle 10 is accommodated in the accommodation slot; and a management server 200 configured to communicate with the micro mobility vehicle 10 and the service vehicle 100 to determine a location and a charging amount of the micro mobility vehicle 10 and manage charging and arrangement of the micro mobility vehicle 10 by guiding the service vehicle 100 to allow the micro mobility vehicle 10 to be accommodated in the service vehicle 100 or withdraw the micro mobility vehicle 10 from the service vehicle 100.

Furthermore, in the management system for a micro mobility vehicle according to an exemplary embodiment of the present disclosure, a withdrawal part for withdrawing or accommodating the micro mobility vehicle 10 may be provided on a side of the accommodation slot, and the accommodation slot may be disposed to direct the withdrawal part to face an external wall of the service vehicle 100.

Alternatively, in the management system for a micro mobility vehicle according to an exemplary embodiment of the present disclosure, the withdrawal part may be provided on a side surface of the service vehicle 100 to form a part of the side surface of the service vehicle 100 and may be vertically rotated to be opened or closed or may slide in a lateral direction to be opened or closed.

That is, unlike the conventional system for simply collecting the micro mobility vehicle 10 on a daily basis and rearranging the micro mobility vehicle 10 the next day, in the management system for a micro mobility vehicle according to an exemplary embodiment of the present disclosure, the management server 200 monitors a location of the micro mobility vehicle 10, a charging amount thereof, and whether the micro mobility vehicle 10 fails and sets a movement path of the service vehicle 100 based on the monitoring result, and the service vehicle 100 travels along the movement path and collects or replaces the micro mobility vehicle 10 on the movement path so that the usable micro mobility vehicle 10 is always provided in a place where the user needs the micro mobility vehicle 10.

FIG. 2 is a diagram illustrating the movement path of the service vehicle 100 in the management system for a micro mobility vehicle according to an exemplary embodiment of the present disclosure. In the management system for a micro mobility vehicle according to an exemplary embodiment of the present disclosure, the management server 200 may set the movement path of the service vehicle 100 based on the location or the charging amount of the micro mobility vehicle 10 and guide the service vehicle 100 to travel along the set movement path.

Furthermore, in the management system for a micro mobility vehicle according to an exemplary embodiment of the present disclosure, the management server 200 may guide the service vehicle 100 to accommodate the micro mobility vehicle 10 located on the movement path to charge the battery or to withdraw the micro mobility vehicle 10 in which the battery is charged to arrange the micro mobility vehicle 10 on the movement path.

Meanwhile, in the management system for a micro mobility vehicle according to an exemplary embodiment of the present disclosure, the management server 200 may determine whether to collect the micro mobility vehicle 10 based on the location or the charging amount of the micro mobility vehicle 10 which is disposed, and when collection of the micro mobility vehicle 10 is required, the management server 200 may allocate the service vehicle 100 at a location where the micro mobility vehicle 10 is disposed.

Furthermore, in the management system for a micro mobility vehicle according to an exemplary embodiment of the present disclosure, when the micro mobility vehicle 10, which is disposed, is located in an area where a use frequency of the user is low, for instance, lower than a predetermined number of usage thereof, the charging amount of the micro mobility vehicle 10 is low, for instance, lower than a predetermined charging amount thereof, or maintenance of the micro mobility vehicle 10 is required, the management server 200 may determine that the collection of micro mobility vehicle 10 is necessary.

Meanwhile, in the management system for a micro mobility vehicle according to an exemplary embodiment of the present disclosure, the allocated service vehicle 100 may accommodate the micro mobility vehicle 10, which is a collection target, in the accommodation slot to collect the micro mobility vehicle 10, and a battery of the accommodated micro mobility vehicle 10 may be charged in the accommodation slot.

Furthermore, in the management system for a micro mobility vehicle according to an exemplary embodiment of the present disclosure, the allocated service vehicle 100 may be provided with a new micro mobility vehicle 10 in the accommodation slot, may withdraw the new micro mobility vehicle 10, and accommodate the micro mobility vehicle 10, which is a collection target, replacing the micro mobility vehicle 10.

For example, the battery of the micro mobility vehicle 10 is consumed according to the use of user at the initial arrangement location, and the micro mobility vehicle 10 moves to another location. The management server 200 may collect the micro mobility vehicle 10 in which the battery is consumed or which is located in a place where the demand for the micro mobility vehicle 10 is low through the service vehicle 100, accommodate the micro mobility vehicle 10 in the accommodation slot to recharge the battery, move the service vehicle 100 accommodating the micro mobility vehicle 10 to a place where the demand for the micro mobility vehicle 10 is high, and withdraw and rearrange the micro mobility vehicle 10. A criterion for the collection or arrangement of the micro mobility vehicle 10 may be the charging amount of the battery, whether maintenance is required, a demand for the micro mobility vehicle 10 by time period, and whether the micro mobility vehicle 10 is requested.

FIG. 3 is a diagram illustrating an exemplary scenario of the management system for a micro mobility vehicle according to an exemplary embodiment of the present disclosure. Here, a PM is a personal mobility and refers to the micro mobility vehicle 10, such as an electric kickboard or Segway, which is used by the user in addition to a vehicle, and a PBV is a purpose built vehicle and refers to a purpose-based vehicle.

In the management system for a micro mobility vehicle according to an exemplary embodiment of the present disclosure, an internal space is formed in the service vehicle 100, and a user may ride in the internal space or the accommodation slot may be disposed therein.

The service vehicle 100 of the management system for a micro mobility vehicle according to an exemplary embodiment of the present disclosure is the PBV which is provided with the accommodation slot for accommodating and charging the micro mobility vehicle 10, and simultaneously, in which the user may ride like a general vehicle and move to a destination. After using the service vehicle 100, the user may rapidly and conveniently move to a final destination using the micro mobility vehicle 10 withdrawn from the accommodation slot. Alternatively, after finishing the use of the micro mobility vehicle 10, the user may store the micro mobility vehicle 10 in the accommodation slot of the micro mobility vehicle 10 of the service vehicle 100 which passes in the vicinity of the user, returning the micro mobility vehicle 10.

Furthermore, in the management system for a micro mobility vehicle according to an exemplary embodiment of the present disclosure, when a rental request of the micro mobility vehicle 10 or a request to use of the service vehicle 100 is received from the user, the management server 200 may allocate the service vehicle 100 in which the micro mobility vehicle 10 is accommodated to a requested place, renting the micro mobility vehicle 10 to the user or allowing the user to board the service vehicle 100.

Meanwhile, in the management system for a micro mobility vehicle according to an exemplary embodiment of the present disclosure, when a return request of the micro mobility vehicle 10 or the request to use of the service vehicle 100 is received from the user, the management server 200 may allocate the service vehicle 100 to a request place, allowing the user to return the micro mobility vehicle 10 to the service vehicle 100 or allowing the user to board the service vehicle 100.

Furthermore, in the management system for a micro mobility vehicle according to an exemplary embodiment of the present disclosure, when a request to use of the micro mobility vehicle 10 or the service vehicle 100 is received from the user, the management server 200 may allocate the service vehicle 100 in which the micro mobility vehicle 10 is accommodated to a requested place, allowing the user to board the service vehicle 100, and when the user gets off, providing the micro mobility vehicle 10 to the user.

As described above, the user requests for the micro mobility vehicle 10 and the service vehicle 100 to determine which section to use the micro mobility vehicle 10 and the service vehicle 100 to the final destination according to a situation, and the micro mobility vehicle 10 is accommodated in the accommodation slot of the service vehicle 100 so that it is possible for the user to transfer the micro mobility vehicle 10 and the service vehicle 100 easily and conveniently.

Meanwhile, in the management system for a micro mobility vehicle according to an exemplary embodiment of the present disclosure, the management server 200 may communicate with a user terminal or a kiosk provided inside or outside the service vehicle 100, receiving a request to use of the micro mobility vehicle 10 or the service vehicle 100 from the user.

Furthermore, in the management system for a micro mobility vehicle according to an exemplary embodiment of the present disclosure, when the request to use of the micro mobility vehicle 10 or the service vehicle 100 is received from the user, or when the user terminates the use of the micro mobility vehicle 10 or the service vehicle 100, the management server 200 may determine a usage fee of the micro mobility vehicle 10 or the service vehicle 100 to bill the usage fee to the user.

In the instant case, when the user moves to the destination using the micro mobility vehicle 10 and the service vehicle 100 together, or when the user returns the micro mobility vehicle 10 to the accommodation slot of the service vehicle 100, a credit is provided so that it is possible to encourage the user to use the micro mobility vehicle 10 and the service vehicle 100.

In accordance with a management system for a micro mobility vehicle, a management server identifies a location and a charging amount of a micro mobility vehicle located on a movement path of a service vehicle, and the service vehicle selectively collects the micro mobility vehicle, in which a charging amount of a battery is insufficient or maintenance is required, or exchanges the micro mobility vehicle with a micro mobility vehicle accommodated in an accommodation slot of the service vehicle based on the identified location and the identified charging amount of the micro mobility vehicle so that the micro mobility vehicle provided to a user may be managed and the user can request for the micro mobility vehicle or a service vehicle to rapidly and conveniently move to a desired destination.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A management system for a micro mobility vehicle, the management system comprising:
a service vehicle which is configured to travel along a movement path, wherein the service vehicle includes a plurality of accommodation slots, each for accommodating the micro mobility vehicle, and is configured for exchanging power with the micro mobility vehicle when the micro mobility vehicle is accommodated in at least one of the accommodation slots; and
a management server configured to communicate with the micro mobility vehicle and the service vehicle to determine a location and a charging amount of the micro mobility vehicle and configured to manage charging and arrangement of the micro mobility vehicle by guiding the service vehicle to allow the micro mobility vehicle to be accommodated in the service vehicle or withdraw the micro mobility vehicle from the service vehicle, wherein a withdrawal part configured to withdraw or accommodate the micro mobility vehicle is provided on a side of each of the plurality of accommodation slots, and the plurality of accommodation slots are disposed to direct the withdrawal part to face an external wall of the service vehicle, and wherein the withdrawal part is configured to be opened and closed individually.

2. The management system of claim 1, wherein the withdrawal part is provided on a side surface of the service vehicle to form a part of the side surface of the service vehicle, and the withdrawal part is vertically rotated to be opened or closed or slides in a lateral direction to be opened or closed.

3. The management system of claim 1, wherein the management server is configured to set the movement path of the service vehicle based on the location of the micro mobility vehicle or the charging amount of the micro mobility vehicle and configured to guide the service vehicle to travel along the set movement path.

4. The management system of claim 3, wherein the management server is configured to guide the service vehicle to accommodate a micro mobility vehicle located on the movement path to charge a battery of the micro mobility vehicle or to withdraw the micro mobility vehicle in which the battery is charged to arrange the micro mobility vehicle on the movement path.

5. The management system of claim 1, wherein the management server is configured to determine whether to collect the micro mobility vehicle based on the location of the arranged micro mobility vehicle or the charging amount of the micro mobility vehicle, and when the collection of the micro mobility vehicle is required, the management server is configured to allocate the service vehicle to a place where the micro mobility vehicle is disposed.

6. The management system of claim 5, wherein, when the arranged micro mobility vehicle is located in a place where a use frequency of the user is lower than a number of predetermined use frequency, the charging amount is lower than a predetermined charging amount, or maintenance of the arranged micro mobility vehicle is required, the management server is configured to determine that the collection of the micro mobility vehicle is necessary.

7. The management system of claim 6, wherein, the collection or the arrangement of the micro mobility vehicle is further determined according to whether the micro mobility vehicle is required in a time period.

8. The management system of claim 5, wherein the allocated service vehicle accommodates a micro mobility vehicle, which is a collection target, in a corresponding accommodation slot among the plurality of accommodation slots to collect the micro mobility vehicle, and a battery of the accommodated micro mobility vehicle is charged in the corresponding accommodation slot.

9. The management system of claim 5, wherein the allocated service vehicle is provided with a new micro mobility vehicle in a corresponding accommodation slot among the plurality of accommodation slots, withdraws the new micro mobility vehicle, and accommodates a micro mobility vehicle which is a collection target to replace the micro mobility vehicle.

10. The management system of claim 1, wherein the service vehicle includes an internal space, for a user to board in the internal space or for the accommodation slots to be disposed in the internal space.

11. The management system of claim 10, wherein, when a rental request for the micro mobility vehicle or a request to use of the service vehicle is received from the user, the management server is configured to allocate the service vehicle in which the micro mobility vehicle is accommodated, to a request place to rent the micro mobility vehicle to the user or to allow the user to board the service vehicle.

12. The management system of claim 10, wherein, when a return request for the micro mobility vehicle or a request to use of the service vehicle is received from the user, the management server is configured to allocate the service vehicle to a request place to allow the user to return the micro mobility vehicle to the service vehicle or to allow the user to board the service vehicle.

13. The management system of claim 10, wherein, when a request to use of the micro mobility vehicle or the service vehicle is received from the user, the management server is configured to allocate the service vehicle in which the micro mobility vehicle is accommodated, to a request place to allow the user to board the service vehicle, and to provide the micro mobility vehicle to the user when the user gets off.

14. The management system of claim 10, wherein the management server is configured to communicate with a user terminal or a kiosk provided inside or outside the service vehicle to receive a request to use of the micro mobility vehicle or the service vehicle from the user.

15. The management system of claim 14, wherein, when the request to use of the micro mobility vehicle or the service vehicle is received from the user, or when the user terminates the use of the micro mobility vehicle or the service vehicle, the management server is configured to determine a usage fee of the micro mobility vehicle or the service vehicle to bill the usage fee to the user.

16. The management system of claim 1, wherein the management server is configured to provide a credit to the user, when the management server determines that the user moves to a destination using the micro mobility vehicle and the service vehicle, or when the user returns the micro mobility vehicle to the accommodation slots of the service vehicle.

17. A method of managing a micro mobility vehicle, the method comprising:
communicating, by a management server, with the micro mobility vehicle and a service vehicle to determine a location and a charging amount of the micro mobility vehicle;
managing charging and arrangement of the micro mobility vehicle by guiding the service vehicle to allow the micro mobility vehicle to be accommodated in the service vehicle or withdraw the micro mobility vehicle from the service vehicle,
wherein the service vehicle is configured to travel along a movement path, and
wherein the service vehicle includes a plurality of accommodation slots, each for accommodating the micro mobility vehicle, and is configured for exchanging power with the micro mobility vehicle when the micro mobility vehicle is accommodated in a corresponding accommodation slot among the plurality of accommodation slots.

18. The method claim 17, wherein the management server is configured to set the movement path of the service vehicle based on the location of the micro mobility vehicle or the charging amount of the micro mobility vehicle and configured to guide the service vehicle to travel along the set movement path.

19. The method claim 17, wherein the management server is configured to provide a credit to a user, when the management server determines that the user moves to a destination using the micro mobility vehicle and the service vehicle, or when the user returns the micro mobility vehicle to the accommodation slots of the service vehicle.

* * * * *